Feb. 28, 1956 P. H. BAUMANN 2,736,310
WHEEL DRESSERS

Filed March 4, 1954 6 Sheets-Sheet 1

INVENTOR
P. Hoegh Baumann
BY Douglas S. Johnson
ATTY.

Feb. 28, 1956 P. H. BAUMANN 2,736,310
WHEEL DRESSERS
Filed March 4, 1954 6 Sheets-Sheet 2

INVENTOR
P. Hoegh Baumann
By Douglas S. Johnson
ATTY.

Feb. 28, 1956  P. H. BAUMANN  2,736,310
WHEEL DRESSERS

Filed March 4, 1954  6 Sheets-Sheet 3

INVENTOR
P. Hoegh Baumann
By Douglas S. Johnson
ATTY

INVENTOR
P. Hoegh Baumann
By Douglas S. Johnson
ATTY.

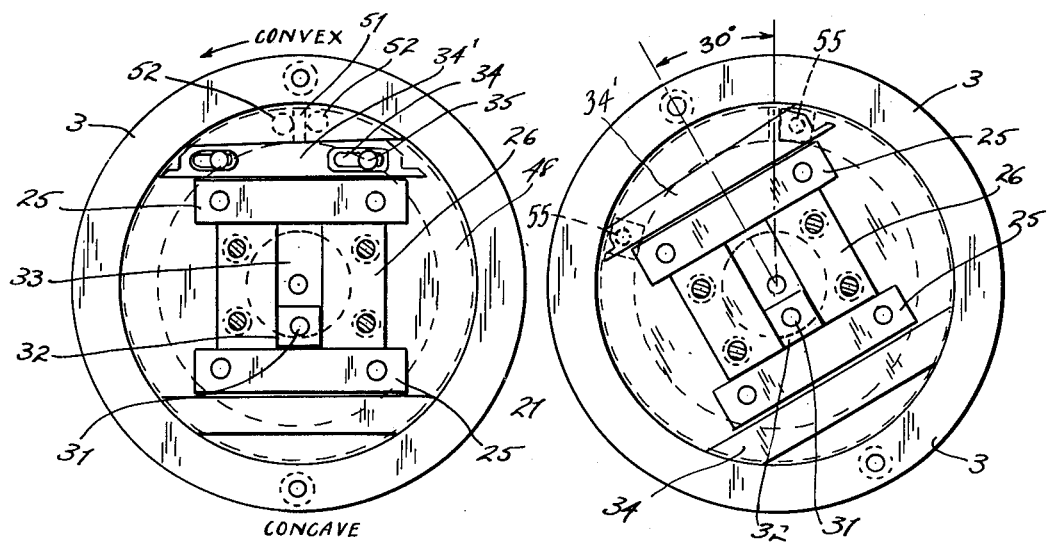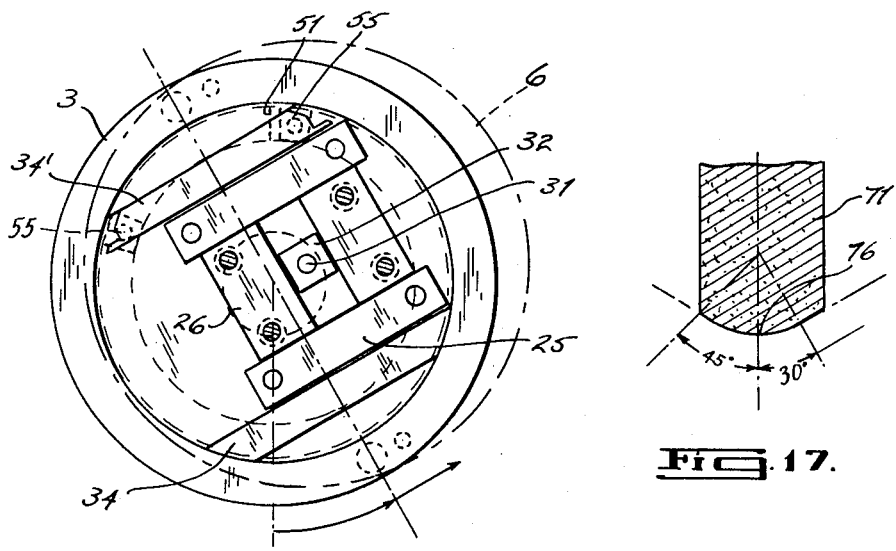

Feb. 28, 1956 P. H. BAUMANN 2,736,310
WHEEL DRESSERS

Filed March 4, 1954 6 Sheets-Sheet 6

INVENTOR
P. Hoegh Baumann
By Douglas S. Johnson
ATTY.

United States Patent Office 2,736,310
Patented Feb. 28, 1956

2,736,310

WHEEL DRESSERS

Poul Hoegh Baumann, Toronto, Ontario, Canada

Application March 4, 1954, Serial No. 414,090

18 Claims. (Cl. 125—11)

This invention relates to improvements in wheel dressers and like devices of the type wherein a diamond or similar cutting element is mounted to rotate about a given axis in order to cut or dress a radius on a grinding wheel or other item.

In the conventional wheel dressers it is a tedious and delicate task to centre the diamond or cutting element in a zero position, usually requiring the dresser to be located on an accurate surface, such as a surface plate, and requiring the use of gauges, micrometers or other instruments, the whole operation requiring very considerable time and care. Also, due to the necessity of bringing the instruments or gauges etc. into contact with the diamond, there is a high incidence of diamond damage in the setting of the dresser. Moreover, the diamond support arm and other parts of the dresser may sag or get out of true, with the result that the setting of the diamond is affected so that accurate dressing cannot be carried out.

One of the principal objects of the present invention therefore is to provide a wheel dresser wherein the diamond or cutting element can be quickly, easily and accurately centered or set in the zero position without requiring the use of any instrument or gauge and without touching the diamond point, to thereby provide an important saving in time and to eliminate accidental diamond damage.

Another important object is to enable the diamond to be adjusted to the zero position without requiring the dresser to be set on an accurate surface or requiring the diamond to be accurately located in its support stock or holder, or the support or holder to maintain any accurate configuration whereby the diamond may be centered while the dresser is in working position on a grinder or in any other position, including a vertical position, and the accuracy of the dresser can be maintained regardless of the deformation of the diamond holder.

Again an important object is to enable a radius and the angles at the end of the radius, normally tangent to the radius curvature, to be dressed with the diamond automatically moving under influence of a single control along the angle at one side of the arc, through the arc and along the angle at the opposite side of the arc. In this connection it is of course an important object to enable a complete range of adjustment of the curvature of the arc, both concave and convex, and of the inclination of the angles at the ends of the arc to be obtained.

Still another important object is to provide a dressing device which can be employed to dress an angular surface of a member, and in this connection it is a particular object to enable the dresser to be used to dress an angular surface without disturbing the wheel-dressing setting of the device for dressing an arc and an angle at each end of the arc.

Again an important object is to provide a single control which will operate the diamond, both in the combined arcuate and angular wheel dressing movement and the straight angular movement, with selection between the movements being quickly and easily made.

Still a further object is to enable dressing to be carried out through an arc and at an angle at each end of the arc, with the angle either forming a tangent to the curve of the arc or non-tangent as desired.

One important feature of the invention resides in providing a rotatable member from which the diamond-carrying stock or holder is adjustably supported and providing an optical system coincident with the axis of the rotatable member by means of which the diamond cutting point can be accurately centered or zeroed on the axis of the rotatable member.

Another important feature resides in forming a rotatable member as a face plate mounted to slide on a rotatable head having adjustable stop means to limit the angular extent of its rotative movement, and providing means to lock the face plate to the head during head rotation and to release the face plate from the head on the head reaching the limit of its rotation and to free the face plate to move on the slide, and providing means to slide the face plate upon the head reaching the limit of its rotative movement. In this connection it is a particular feature to provide a single rotatable control member to operate, upon rotation, the head and face plate together through the angular extent of the head movement and subsequently to operate the face plate independently of the head in its sliding movement.

To provide positive controlled movement of the face plate and head another important feature of the invention resides in providing a co-operating locking pin and brake arrangement wherein the face plate is locked to the head with a releasable pin interlock until the head reaches the extent of its angular movement, whereupon, as the pin interlock releases, the brake operates to lock the head in its limit position while the face plate operates on its slide, and until the face re-registers with the head on the completion of its return sliding movement, and thereafter the brake releases to allow rotative movement of the face plate and head away from the limit position of the head.

Another important feature resides in providing a crank arrangement to operate the face plate in its sliding movement at the termination of the rotative movement of the interlocked face plate and head, whereby the sliding or straight-line movement of the face plate is precisely tangential to its arcuate movement.

Again a feature resides in providing a roller bearing sliding action for the face plate with means to adjustably regulate the pressure thrust on the roller members to control dynamic drag between the relatively sliding surfaces.

Still another feature resides in providing a micrometer arrangement on the face plate to enable the use of Johansson or "Jo" blocks to be employed to accurately set the radius to be dressed.

Again it is a feature to provide a novel mounting for the cutting element to enable accurate dressing on angles non-tangent to the radius to be carried out.

These and other objects and features will become apparent from the following description taken in conjunction with the accompanying drawings in which:

Figure 4 is a diagrammatic sectional view illustrating the dressing of a convex surface on a grinding wheel or the like.

Figure 14 is a view similar to Figure 9 showing the entire head assembly rotated to a 180° to dress a convex surface.

Figure 15 is a view similar to Figure 11 showing the head rotated to a limit stop position.

Figure 16 is a view similar to Figure 12 showing the subsequent sliding movement of the face plate carrying slide following the head reaching its stop position.

Figure 17 is a view similar to Figure 13 but illustrating the convex curvature dressed with the position of the head reversed.

Figure 1:
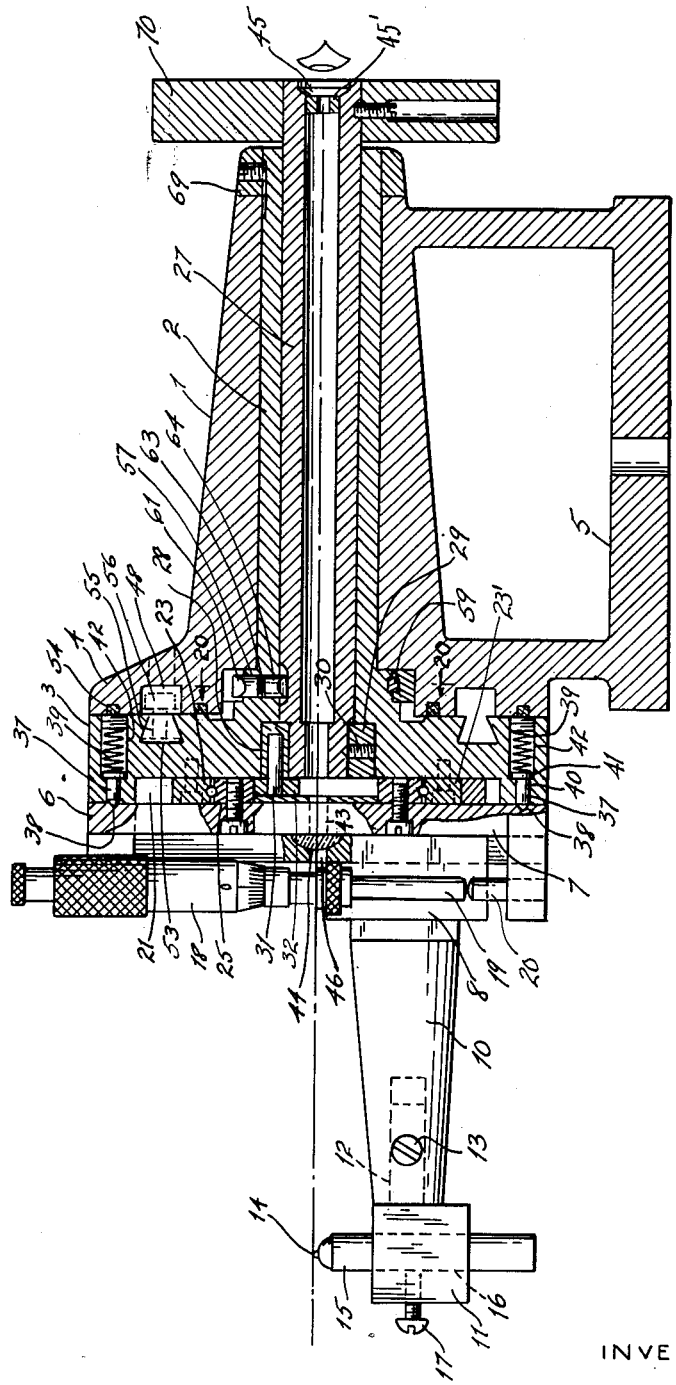
Figure 1 is a part side elevational, part longitudinal vertical sectional view of a wheel dresser constructed in accordance with the invention.
Figure 2:
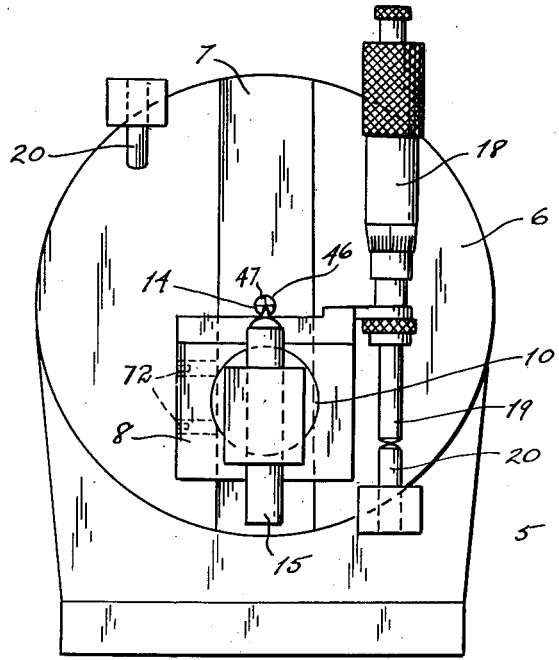
Figure 2 is a front elevational view of the dresser.
Figure 3:
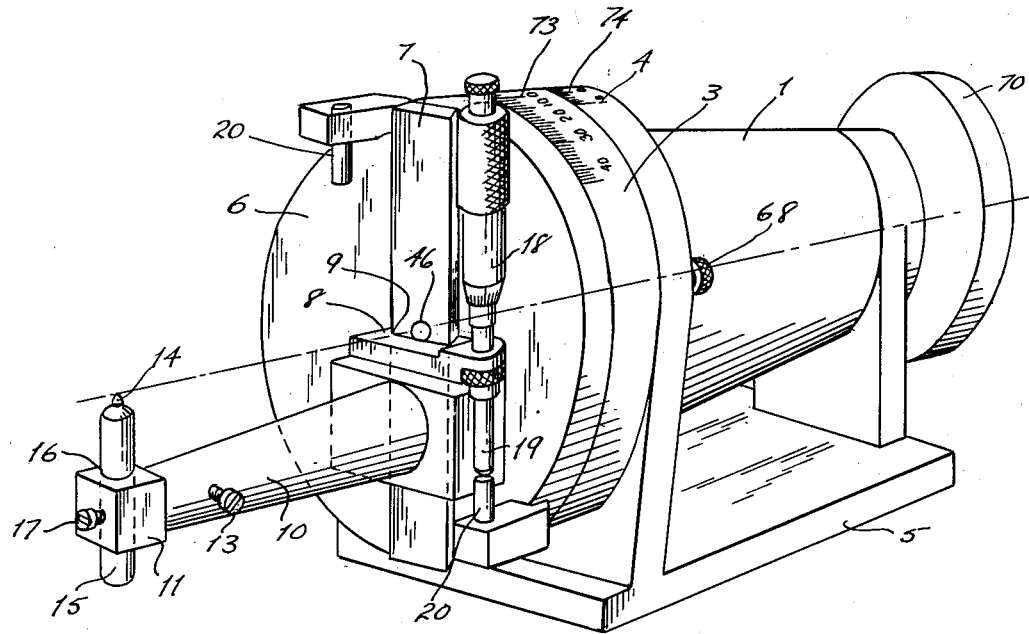
Figure 3 is a perspective view.

Referring first to Figures 1, 2 and 3, the wheel dressing device comprises a housing 1 within which is journalled a hollow main spindle 2 carrying a head 3 which abuts the face of a flanged portion 4 of the housing, the housing being provided with a suitable support base 5.

Carried on the head 3 by a slide means, hereinafter more fully described, is a face plate 6 provided with a dovetailed guide bar 7 along which operates a slide 8 provided with a complementary dovetailed groove formation 9. The slide 8 carries a dressing arm 10 on which is mounted a holder 11 having a projection 12 introduced into a suitable opening into the end of arm 10 and held in position by clamp screw 13.

A cutting element 14, normally a diamond, is mounted in a stock 15 slidably received in a bore 16 in the holder 11 and held in adjusted position by a clamp screw 17. This element 14 need not be centered accurately in the stock.

Mounted on the slide 8 is a micrometer 18 with the end of the micrometer screw 19 being adapted to advance against either one of a pair of stops 20 in the form of anvils carried by the face plate 6 in opposing relation to co-operate with the micrometer screw upon the face plate and head being rotated through 180° and the slide 8 inverted for cutting convex and concave curves, as will hereinafter appear.

As best shown in Figures 9 to 12, the head 3 has a central recess 21 defining an annular face 22 against which the face plate 6 is adapted to abut. Secured to the head within the recess 21 are a pair of spaced bars 23 and 23' having their adjacent edges formed with a V to receive balls or rollers 24. The rear of the face plate 6 carries a corresponding pair of bars 25 between which is mounted a slotted guide plate or guide 26. With this arrangement the face plate 6 is slidable longitudinally of the bars 23 and 23' carried by the head, with the rollers 24 operating in the V's of the bars 23 and 25, maintaining the parts from separation axially of the main spindle 2.

Journalled within and co-axial with the main spindle 2 is a hollow governing spindle 27, on the inner end of which and seating within a recess or counterbore 28 in the head 3 is a collar 29 which is rotatable to adjusted positions, being fixed by the set screw 30.

The collar 29 carries a crank 31 which in turn carries, loosely thereon, a shoe 32 of square configuration operating in the slot 33 of the slotted guide plate 26 carried by the face plate 6.

Bar 23' is tapered and operates along a tapered backing bar 34'. Bar 23' is provided with slots 34 in parallel relation to the longitudinal edge of the bar against which backing bar 34' abuts. Extending through these slots 34 are pins 35 with a clearance fit between the diameter of the pins and the walls of the slots but a tight slide fit between the face plates 6 and the heads of the pins 35, the purpose being to allow the tapered bar 23' to be moved longitudinally along the tapered backing bar 34' in order to take up clearance between the bars 23, 23', and the balls.

The face plate 6 is normally releasably locked to the head 3 by means of pins 37 carried by the head and urged into shallow sloping-walled recesses or orifices 38 by means of springs 39, the pins operating through suitable bores 40 in the head, with the heads 41 of the pins operating in enlarged bores 42 containing the springs 39.

With the pins 37 engaged in the orifices 38 the face plate 6 and head 3, both of which are circular, are co-axial and co-axial with the governing spindle 27 and the main spindle 2. The face plate 6 is provided with a bore 43 therethrough which is centered on the axis of the face plate and which, with the face plate co-axial with the head as shown in Figure 1, the centre line of this bore is coincident with the axis of the governing spindle 27. The bore 43 extends as well through the slotted guide plate or block 26, and mounted in the bore 43 is one lens element 44 of an optical sighting system constituted by this lens element, the governing spindle 27 and lens element 45 at the end of the spindle 27 remote from the face plate, which end is also provided with a sighting aperture 45'.

The optical system constituted by the pair of lenses 44 and 45 and the sighting tube formed by the governing spindle 27, together with the bore 43 in the face plate in which lens 44 is mounted and the registering bore 46 in the guide bar 7, is arranged to have its focal plane coincident with the plane of the cutting element 14. An arrangement of cross hairs 47 (Fig. 20) in the face plate bore 43 enables the point of the cutting element 14 to be located with precise accuracy on the axis of the optical system and hence on the axis of the head 3.

Figure 18:
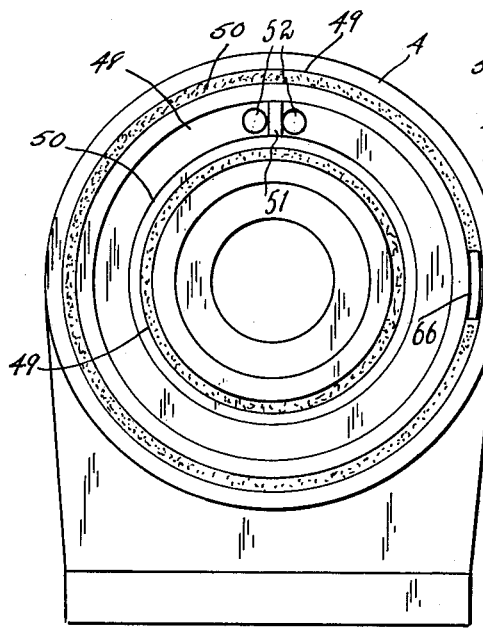
Figure 18 is a front elevational view of the housing with the head and face plate assemblies removed.

The flanged portion 4 of the housing 1 is provided with a relatively wide annular groove 48 and a pair of concentric grooves 49 in which is received a packing 50, as best seen in Figure 18.

A bar 5, as best shown in Figure 18, divides the groove 48 at the top of the housing and a pair of openings 52 spaced on either side of the bar 51 provide access into the groove 48 from the rear of the flange portion.

The abutting face of the head 3 is provided with a registering dovetailed groove 53 within which is arranged a pair of dovetail blocks 54 into which are threaded screws 55 having enlarged heads 56 operating in the groove 48 of the housing flange. The blocks 54 may be locked in adjusted position around the groove 53 by tightening of the screws 55 to provide an interlock between the dovetailed surfaces of the groove and blocks, and the bar 51 then forms a stop against which the heads 56 of the screws 55 operating in the groove 48 are adapted to abut to limit the extent of head rotation, one block and screw arrangement limiting rotation in one direction and the other block and screw arrangement limiting rotation in the opposite direction.

Figure 10:
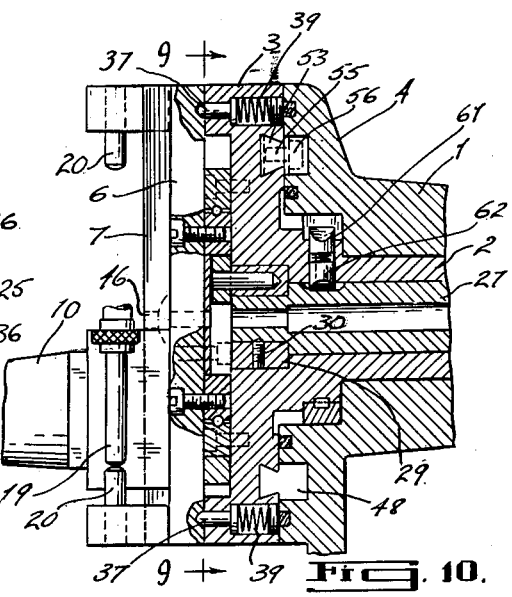
Figure 10 is a fragmentary longitudinal vertical section through the rotating head and support housing.
Figure 20:
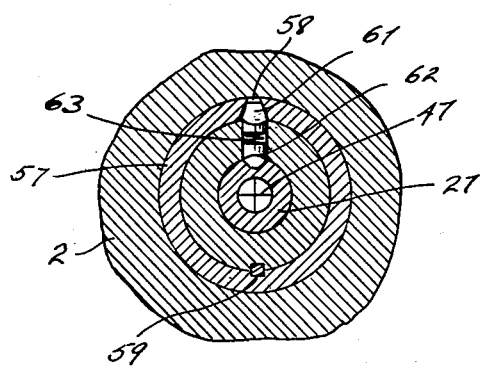
Figure 20 is a fragmentary transverse vertical sectional view illustrating the means for locking the main spindle upon rotation of the governing spindle relative thereto and taken on the line 20—20 of Figure 1.

As shown in Figures 1, 10, and particularly Figure 20, surrounding the main spindle 2 adjacent the head 3 is a brake band or ring 57 which is split at one side, as at 58, and which is fixed against relative movement relative to the main spindle 2 by a key 59.

The inner governing spindle 27 is provided with a groove 60 and a retractible pin arrangement comprising the pin segments 61 and 62 held apart by a spring 63 mounted in a bore 64 provided in the main spindle 2 and registering with the split or break in the brake band 57, is adapted to enter the groove 60 when the governing spindle 27 is turned to register this groove with the bore 64 in the main spindle. With the parts in this relationship, as shown in Figure 20, the pin segment 61, which is tapered, is partially withdrawn from between the ends of the brake band 57 to release the brake.

Upon the governing spindle 27 being rotated relative to the main spindle 2 to force or cam the pin segment 62 out of the groove 60, the pin segment 61 is forced radially outwardly between the ends of the brake band 57 to expand the band into braking engagement with the housing 1 to lock the main shaft 2 to the housing.

Figure 19:
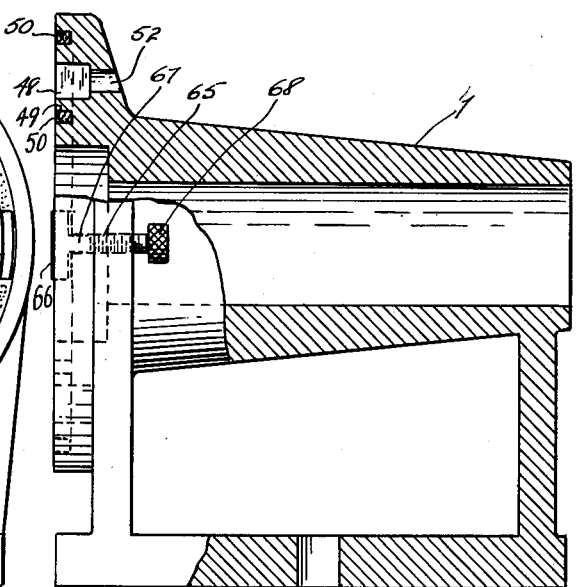
Figure 19 is a part elevational, part vertical sectional view of the housing showing the head locking means.

As best shown in Figures 18 and 19, the flange portion 4 of the housing has a bore 65 therein communicating with the outer groove 49, and this bore is threaded for a portion of its length. A thin curved stop block 66 is arranged in the groove 49 and provided with a projecting leg 67 entering the bore 65 and against which operates the end of a lock screw 68, the block 66 and lock screw 68 forming a means of temporarily locking the head 3 to the housing to allow the device to be set up for dressing wheels, as hereinafter more fully described.

Secured to the main spindle 2 and abutting the end of the housing 1 opposite to the flange portion 4 is a thrust ring 69, while secured to the governing spindle 27 is a hand wheel or control 70.

In operation the cutting element, normally a diamond 14, is centered on the axis of rotation of the head 3 with the face plate 6 co-axial with the head and the pins 37 entered in the orifices 38 and the pin segment 62 entered in the groove 60 to release the brake band 57 freeing the main spindle 2 from the housing 1.

In the setting of the cutting element 14 the micrometer screw 19 is advanced against the anvil 20 with the micrometer at a zero setting.

The optical system for the device comprises basically the lenses 44 and 45, sighting aperture at the end of the governing spindle 27, the spindle itself, and cross hairs 47. By sighting through this system, the holder 11 and stock 15 are adjusted to bring the cutting point of the diamond, or other cutting element such as a carbide tip, exactly in line with the optical system cross hairs. Consequently, the point is also exactly in line with the axis of the governing spindle 27, main spindle 2, head 3 and face plate 6. This adjustment is an extremely simple one and it is to be noted that the diamond is not touched by any gauge or other instrument, and will therefore not be accidentally damaged. Further, it is not necessary to set the dresser on any flat surface, such as a surface plate, in order to adjust the cutting element or diamond to the zero position, and this adjustment can be quickly and easily made with the dresser in any position.

Figure 5:
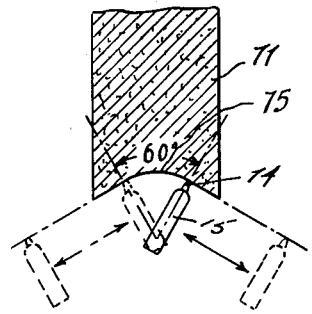
Figure 5 is a view similar to Figure 4 but illustrating the dressing of a concave surface.
Figure 13:
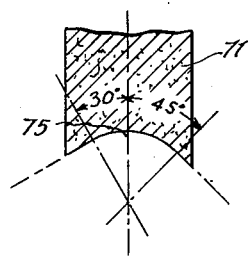
Figure 13 is a view generally similar to Figure 5 illustrating the type of surface which may be dressed under the movements depicted in Figures 9 to 12, the surface being non-symmetrical about the centre line.

Further, with this system the highest point of the diamond or cutting element can be quickly selected and accurately centered. Then to set the desired radius, suppose a radius of one inch to cut a concave surface in a grinding wheel 71, as indicated in Figures 5 and 13, the micrometer screw 19 may be advanced an inch or alternatively and preferably where an exact and accurate measurement is required, a one-inch Jo block is introduced between the anvil at the end of the micrometer screw 19 to displace or elevate the cutting element 14 precisely one inch above the centre or axis of the system.

With the dresser set to cut a concave surface it will be noted that the crank 31 is disposed above the axis of the system, with the head 3 and face plate 6 in the relative position, shown in Figures 1 and 10.

The adjustment of the position of the micrometer 18 and the corresponding adjustment of the cutting element 14 is provided by sliding of the slide 8 up the guide bar 7 to the position required, whereupon the slide 8 is then locked in the set position by means of lock screws 72.

This zeroing is carried out with the zero of the scale 73 marked out on the periphery of the head 3 set on the zero 74 of the scale markings set out on the housing flange 4.

After the size of the radius to be dressed is set, the extent of the radius, either side of zero centre on the scale 74, is determined by rotation of the head 2 first to one side through the number of degrees desired, say 30°, as shown in Figure 13 and also Figure 5, with the screws 55 slackened, the screws being held in register with their access openings by a wrench or other suitable tool during head movement. Then with the reading of 30° on the scale 73 opposite the zero scale 74, the one clamp screw 55 is tightened to lock it in position through the binding between its block 54 and the walls of the groove 53.

Similarly the angle is set on the opposite side by rotation of the head 3 so that its scale reading, e. g., 45° in Figure 3 or 30° in Figure 5, is opposite the zero of the scale 74 and the other block screw 55 is tightened, the tightening of the screws 55 being effected through the openings 52, so that in the locked position the heads 56 of these screws are abutting the bar 51.

The dresser is now ready for operation to dress the concave curve having a radius of one inch and an extent on one side of the centre line of the wheel 71 of 30° and on the other side either 30° or 45° depending on the setting, the device being adapted to dress an angle at each of the ends of the concave arc 75 which is tangent to the arc.

The dressing is carried out by rotation of the hand wheel or control 70 with the shoe 32, carried by the crank 31 of the governing spindle 27 rotated by the hand wheel, acting to rotate the face plate 6 and the head 3 which is releasably locked to the face plate by the pins 37. The main spindle 2, in consequence also rotates with the governing spindle 27 and the groove 60 remains in register with the bore 64 in the governing and main spindles respectively, to allow the pin segment 61 to retract from between the ends of the brake band 57 to release the brake.

Figure 9:
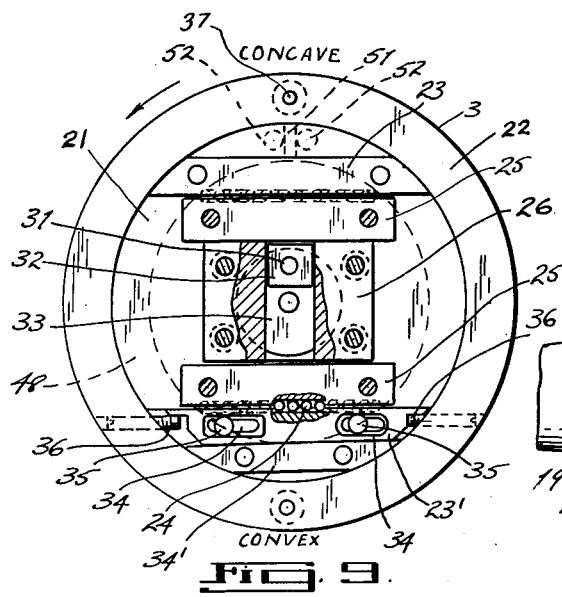
Figure 9 is a vertical sectional view partly broken away on the line 9—9 of Figure 10.
Figure 11:
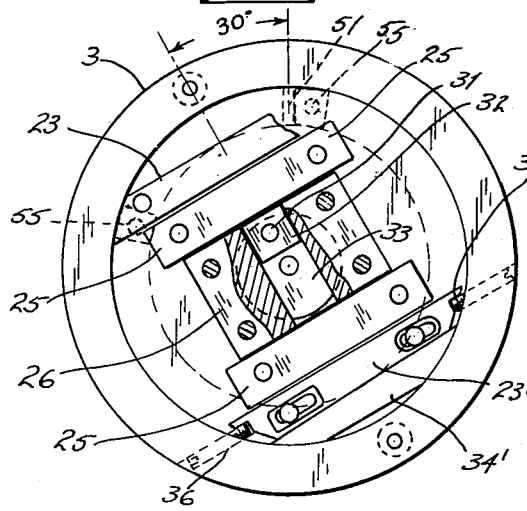
Figure 11 is a view similar to Figure 9 but showing the head rotated to a limit position.
Figure 12:
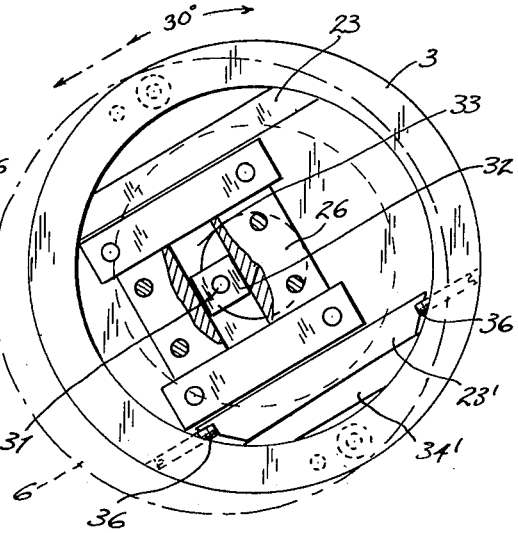
Figure 12 is a view similar to Figure 11 but illustrating the sliding movement of the face plate carrying slide following the head reaching its limit position.

The combined rotative movement of the releasably interlocked head and face plate continues, as illustrated in Figures 9 and 11, until the head 56 of the one screw 55 comes into contact with the bar 51, preventing further head rotation. At this instant continued rotation of the governing spindle 27 operating through the shoe 32 acting against slotted guide plate 26 carried by the face plate 6, actuates the face plate in a lateral sliding movement, as illustrated in Figure 12, along the angle defined by the bars 23 and 23' through the slide connection afforded by the bars 23—23', rollers 24 and bars 25. The angle of the relative sliding bar members is of course determined by the position of the clamp screw or stop screw 55.

As the governing spindle 27 rotates past the position, where one of the stop screws 55 contacts the bar 51, the direct drive between the spindle and the face plate 6 through the crank 31 and shoe 32 will provide positive movement of the face plate. The head 3, however, cannot further rotate with the result that the continued movement of the face plate will cam the pins 37 inwardly against the springs 39 to release the face plate from the head. The rotation of the governing spindle 27 relative to the main spindle 2 will force pin segment 62 out of the groove 60 to expand the brakeband 57 and lock the main spindle 2 to the housing.

Thus rotative movement of the main spindle 2 and hence head 3 is positively locked, while the governing spindle 27 is operating the face plate slide and hence the face plate in its angular movement.

Upon return of the face plate to the position of Figure 11, where the face plate is brought back into axial alignment with the head, the arrangement of the pins 37, orifices 38 and the brake groove 60 is such that the pins 37 will have begun entry into the orifices 38 before the pin segment 62 sets down into the groove 60 to release the brake.

Because the dresser admits of radius set-up by means of "Jo" blocks, great accuracy can be obtained and, moreover, can be obtained very readily and quickly. Moreover, deformation of the dressing arm 10, or any deformation of the anvil 20, which may have occurred prior to the use of the tool, will not affect the accuracy of the device since these factors are taken into account at the zero setting when, regardless of such deformation, the cutting element is centered on the optical and rotating axis of the system.

While Figures 9 to 12 illustrate the movement of the face plate carrying slide, and hence the face plate, to one side, it will be appreciated that the movement to the opposite side is precisely the same.

It is important to note that the movement of the cutting element throughout the arcuate movement, and throughout the angular movement on angles which are tangent to the arc at the ends thereof, is effected through the single control 70. Moreover, it is to be noted that the cutting element is positively locked against rotation about the axis of the dresser while it is moving with its angular movement, not only by the stop screws 55 but by the brake device 57 which automatically goes into function as soon as the angular movement commences, and which automatically releases as the angular movement ends.

Figure 4:
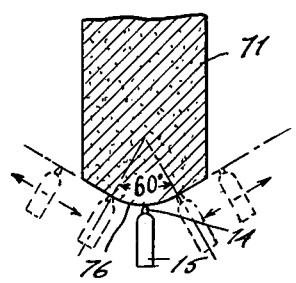
Figure 7:
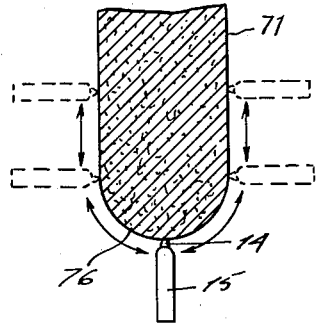
Figure 7 is a view illustrating the dressing of a curved convex surface and the side of wheel.

The set-up illustrated in Figures 9 to 12 is for the purpose of dressing a concave curve. By rotation of the entire head and face plate assembly through 180°, upon loosening of the stop screws 55 to locate the shoe 32 at the bottom of the slot 33 of the slotted guide plate 26, the dresser may be set up to dress convex curves, such as shown in Figures 4, 7 and 17. When this inversion of the head and face plate assembly is carried out the slide 8 is removed from the guide bar 7, inverted and replaced, so that the micrometer screw 19 of the micrometer 18 operates against the opposite anvil 20.

To cut the convex curve the cutting element 14 will be lowered below the optical and rotative axis of the system to the desired radial extent, after being centered on the axis by the optical system, with the micrometer at a zero setting. In this case a "Jo" block may be introduced between the anvil 20 and the end of the micrometer screw 19 and the cutting element 14 centered. The "Jo" block may then be removed and the radial extent, that is, the radius of the curve to be dressed, is immediately determined with extremely high accuracy, governed only by the limitation of the accuracy of the "Jo" block. Then by setting of the stop screws 55 at the appropriate points on opposite sides of the bar 51, as determined by the scale 73, the convex arcs 76 are determined.

With the set-up illustrated, upon completion of the arc to the angular extent set by the stop screws 55, e. g. 30° each side of centre in Figure 4, 90° each side of centre in Figure 7, and 45° on one side of centre and 30° on the other side of centre in Figure 17, the cutting element will move on an angle tangent to the curves 76 at the ends thereof.

Figure 6:
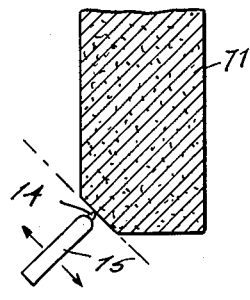
Figure 6 is a view similar to Figure 4 illustrating the dressing of an angle.
Figure 8:
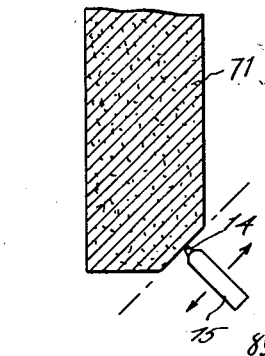
Figure 8 is a view similar to Figure 6 but showing the dressing of an opposite angle.

It may be desired to dress on an angle somewhere between the angle set on opposite sides of the centre line in the combined radius and angle dressing described above. With the device illustrated, this angle dressing may be carried out without disturbing the set-up for the combined radius and angle dressing described. This angular dressing may be carried out by rotation of the governing spindle 27 with the head 3 locked to the face plate 6 by the pins 37 to any desired angle between the angles set as limits by the stop screws 55, the desired angle being determined by the scale 73. Then by tightening of lock screw 68 to bring block 66 against the head 3 to lock the head to the housing, the governing spindle may be turned through 180°, which movement forces the pin segment 62 out of the groove 60, applying the brake 57 to lock the main spindle 2 to the housing 1. Thus with the governing spindle 27 turned through 180°, the brake effects a locking of the main spindle 2 to the housing 1, and the lock screw 68 can be released to free any unbalanced pressure on the head 3, and the hand wheel 70 may then be rotated, through the extent of half a turn back and forth, to dress purely on an angle, as illustrated in Figures 6 and 8.

It will be appreciated that dressing on the angle may be carried out without rotation of the governing spindle 27 through 180°, by reliance solely on the locking effect obtained by operation of the lock screw 68, forcing the stop block 66 against the head 3. However, since this locking may impart some unbalance to the head which might effect the accuracy of the dresser, it is desired that this block be simply used as a temporary lock, holding the head 3 against rotation until the rotation of the governing spindle 27 to operate the brake 57 is effective to lock the head 3.

It will be understood that, with the head 3 thus locked, by rotation of the governing spindle to one side through an angle of 90° and then back through 180°, the governing spindle will impart a throw to the face plate by action of the loose shoe 32 in sliding connection with the guide plate 26 of the face plate, to provide double the throw provided in the angular movement of the combined angular and radius dressing. This fact will be realized when it is appreciated that in the case of the head 3 not being locked, the governing spindle upon returning the head to the center position would start rotating the head when the brake had loosened locking contact between spindle 2 and housing 1, whereas with the head locked the rotation of the governing spindle will continue movement of the head past the center to the opposite side.

Upon rotation of the governing spindle 27 back through the 180°, or through 180° in either direction, to reregister the groove 60 with the bore 64 in the main spindle 2, to allow the pin 61—62 to retract, the brake automatically releases, freeing the head 3, and the dresser will be in position to immediately carry out the previously determined radius and angle dressing.

Figure 21:
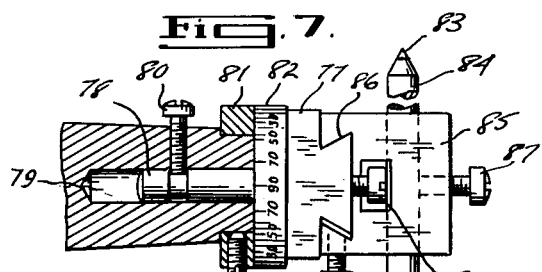
Figure 21 is an end elevational view of an alternative mounting for the cutting element showing the mounting supported from the dressing arm, the latter being shown in vertical section.
Figure 22:
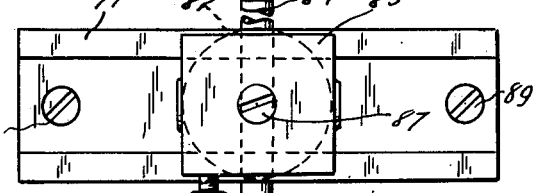
Figure 22 is a front elevational view of the mounting of Figure 21.

The above action of the dresser has been described as providing a curve terminating in an angle at each end, which is tangent to the curve. It may frequently be desirable to provide an angle at the end of the curvature which is non-tangent to the curve. Figures 21 and 22 illustrate a mounting for the cutting element which will readily enable this non-tangent angle to be determined with accuracy and quickly and easily. In this case the holder 11 is replaced by a dovetailed guide bar 77 which carries a projecting pin 78 adapted to be received into a bore 79 in the end of the dressing arm 10 to rotatably support the guide bar. The dressing arm 10 is shown provided with a locking screw 80 to engage the pin 78 and with an adjustable zero set ring 81 forming a reference point for a scale ring 82 carried by the guide bar.

A cutting element, normally a diamond 83, is supported in a stock 84 slidable in a suitable bore provided in a holder slide 85 which is slidably mounted on the guide bar 77, being formed with a co-operating dovetail portion 86.

Vertical adjustment of the stock 84 is regulated by a lock screw 87, while adjustment of the holder slide 85 along the guide bar 77 is regulated by a lock screw 88. Stops 89 at the ends of the guide bar 77 are provided to limit holder slide movement.

In operation the cutting element 83 is located with its cutting point on the axis of the dresser by means of the optical system, with the parts all set to zero position. The cutting element may then be rotated, as determined by the scale ring 82 which has been previously set to zero in the zeroing of the cutting element through a desired angular extent, and the cutting element may then be bodily shifted to one side by sliding the holder 85 if desired against a "Jo" block introduced between the holder and stop pin 89.

Through proper calculations the degree of rotation and sliding movement may be computed to give the desired non-tangent angle.

With the cutting element thus set, various curve formations and angular formations can be dressed which vary from curves struck on a simple radius and tangential angles.

It will be understood that various details of the dresser may be altered without departing from the scope of the appended claims.

What I claim as my invention is:

1. In a wheel dresser, a rotatable head, an arm carried by said head, a cutting element carried by said arm whereby said cutting element is adjustable relative to the said head, and optical sighting means extending through said head and coincident with and including cross hairs intersecting at the axis of said rotatable head for centering said cutting element on the axis of rotation of said head.

2. In a wheel dresser, a rotatable head, a dresser arm, a cutting element carried by said arm, means supporting said arm from said head for movement relative thereto transversely of its axis of rotation, gauge means for accurately measuring movement of said arm transversely of said axis of rotation, and an optical sighting system extending through said head and centered on and including cross hairs intersecting at said axis of rotation for centering said cutting element on the head axis.

3. A device as claimed in claim 2 in which the focal point of said optical system is coincident with the cutting element with said cutting element centered on the head axis.

4. In a wheel dresser, a housing, a hollow spindle journalled in said housing, a head assembly carried by and rotatable with said spindle about the axis of said spindle, a dresser arm, a cutting element carried by said dresser arm, means supporting said arm from said head assembly for movement relative thereto transversely of said spindle axis, cooperating gauge members carried by said arm and head assembly to measure displacement of said arm transversely of said spindle axis, and an optical system centered on the axis of and including said hollow spindle, said optical system including cross hairs intersecting at said axis of said spindle for sighting through said hollow spindle to centre said cutting element on the spindle axis.

5. In a wheel dresser, a housing, a hollow spindle journalled in said housing, a head carried by said spindle to rotate with said spindle about the spindle axis, a face plate mounted on and slidable relative to said head in a direction transversely of the spindle axis, a dresser arm, cooperating gauge members carried by said arm and face plate to measure displacement of said arm relative to said face plate transversely of said spindle axis, a cutting element carried by said dresser arm from adjustable movement relative to said arm and face plate, and an optical system centered on the axis of said hollow spindle and including said hollow spindle and cross hairs intersecting at the spindle axis for sighting through said hollow spindle to centre said cutting element on the spindle axis.

6. A wheel dresser comprising a housing, a hollow main spindle journalled in said housing, a head carried by said main spindle to rotate with said spindle about the spindle axis, a face plate mounted to slide on said head transversely of the spindle axis, means releasably holding said face plate against sliding movement on said head under turning of said head, means to limit turning movement of said head, a hollow governing spindle co-axial with and journalled within said main spindle, means carried by said governing spindle to actuate said face plate to slide relative to said head upon said head reaching a limit position of turning, a dresser arm supported from said face plate for adjustable movement thereof transversely of said spindle axis, cooperating gauge members carried by said arm and face plate to measure displacement of said arm relative to said face plate transversely of said spindle axis, a cutting element carried by said arm, an optical system centered on the axis of said governing spindle and including said hollow spindle and cross hairs intersecting at the spindle axis for sighting through said governing spindle to centre said cutting element on the governing spindle axis, and control means for rotating said governing spindle.

7. A wheel dresser comprising a housing, a hollow main spindle journalled in said housing, a head carried by said main spindle, a face plate, slide means carried by said face plate and head to support said face plate for sliding movement relative to said head in a direction transversely of the axis of said spindle, releasable pin means releasably holding said face plate against sliding movement relative to said head under turning of said main spindle and head, adjustable stop means to limit turning of said head, a hollow governing spindle co-axial with and journalled within said main spindle means for rotating said governing spindle, a crank carried by said governing spindle, means providing a sliding connection between said crank and said face plate, said governing spindle being adapted on turning to rotate said face plate and said head through the limits of the head movement through said releasable pin means and to thereafter slide said face plate relative to said head through said crank means on release of said releasable pin means, a dresser arm adjustably supported from said face plate, cooperating gauge members carried by said arm and face plate to measure displacement of said arm relative to said face plate transversely of said spindle axis, a cutting element carried by said arm, and an optical system centered on the axis of said governing spindle and including said hollow spindle and cross hairs intersecting at the spindle axis to centre said cutting element on the governing spindle axis.

8. A device as claimed in claim 7 having means operable under rotation of said governing spindle to lock said main spindle to said housing upon said head reaching a limit position coincident with release of said releasable pin means.

9. A wheel dresser comprising a housing, a head rotatably supported by said housing, adjustable stop means to limit the extent of rotation of said head, a face plate mounted to slide relative to said housing, means releasably holding said face plate against movement relative to said head, a single rotatable control member coaxial with said head connected with said face plate in a sliding connection at a point displaced from the axis of said head to rotate said face plate and head through the limits of head rotation and to thereafter release said face plate from said head and subsequently actuate said face plate to slide relative to said head, means actuated by said control member to lock said head in its limit position during sliding of said face plate, a dresser arm adjustable on said face plate, and a cutting element carried by said arm.

10. In a wheel dresser, a rotatable head, adjustable stop means to limit rotation of said head, a member carried by said head and slidable relative thereto, means releasably securing said member to said head against sliding, a cutting element carrying dressing arm carried by said member, means for locking said head against rotation in a limit position of its rotative movement, a single control element to operate said head and slidable member in unison to a limit position of said head, release said releasable means and operate said sliding member to slide relative to said head with said head in said limit position, and a brake mechanism actuated by said control element when said head reaches said limit position to lock said head in said limit position.

11. A wheel dresser comprising a housing, a main spindle journalled in said housing, a rotatable head carried by said main spindle, means to limit rotative movement of said head, a member carried by said head and mounted thereon to slide relative thereto, means releasably securing said member against movement relative to said head, a cutting element carrying support arm adjustably mounted on said member, a single control element to operate on said member to rotate said member and head in unison throughout the limits of head rotative movement and to operate said member to slide on said head upon said head reaching a limit position of its rotation, and a brake mechanism actuated by said control member when said head reaches said limit position to lock said head in said limit position.

12. A wheel dresser comprising a housing, a hollow main spindle journalled in said housing, a head carried by said main spindle, guide means carried by said head, a face plate mounted on said head and slidable along said guide means, a governing spindle journalled in said hollow main spindle, means controlled by said governing spindle to actuate said face plate along said guide means upon said governing spindle being rotated relative to said main spindle, a control for rotating said governing spindle, means releasably securing said head to said face plate with said face plate disposed centrally of said head to effect head rotation on rotation of said face plate, an adjustable stop means to limit head rotation and effect release of said head from said face plate, a brake arrangement operable on relative rotation of said governing spindle and main spindle to move said face plate along said slide from its centrally disposed position to lock said main spindle to said housing, a dressing arm carried by said face plate and adjustable thereon, and a cutting element carried by said dressing arm.

13. A device as claimed in claim 12, in which said means releasably securing said head and face plate comprises an arrangement of pins carried by one of said latter members and having tapered points received in shallow recesses carried by the other of said latter members, and spring means urging said points into said recesses.

14. A device as claimed in claim 12, in which said brake arrangement comprises a split brake ring carried by said main spindle, a radial bore in said main spindle registering with the split of said ring, a pin device mounted in said bore and adapted to enter between the ends of said ring to expand said ring, and a groove formed in said governing spindle and adapted for one position of said spindles to register with said bore to allow said pin device to be retracted by said ring from ring-expanding position.

15. A device as claimed in claim 12, in which said means carried by said governing spindle to operate the face plate comprises a crank offset from the spindle axis, a square shoe loosely carried by said crank, and means carried by said face plate defining a longitudinal slot in which said cam operates.

16. A device as claimed in claim 12, in which said cutting element is adjustably mounted in a slide which in turn is rotatably mounted on said dressing arm.

17. A device as claimed in claim 12, in which said dressing arm is mounted on a slide carried by said face plate, a micrometer carried by said slide having an adjustable micrometer screw, and anvil means carried by said face plate against which said micrometer screw is adapted to engage.

18. A wheel dresser comprising a housing, a head rotatably supported by said housing, adjustable stop means to limit the extent of rotation of said head, a face plate mounted to slide relative to said housing, means releasably holding said face plate against movement relative to said head, a single rotatable control member coaxial with said head, means connecting said control member and face plate to rotate said face plate and head through the limits of head rotation and to thereafter release said face plate from said head and subsequentially actuate said face plate to slide relative to said head, means actuated by said control member to lock said head in its limit position during sliding of said face plate, a dresser arm adjustably mounted on said face place, and a cutting element carried by said arm.

References Cited in the file of this patent

UNITED STATES PATENTS

| | | |
|---|---|---|
| 2,218,775 | Turrettini | Oct. 22, 1940 |
| 2,343,949 | Bellinger | Mar. 14, 1944 |
| 2,404,465 | Statia | July 23, 1946 |
| 2,585,305 | Fritts | Feb. 12, 1952 |
| 2,617,403 | Beauchemin | Nov. 11, 1952 |

FOREIGN PATENTS

| | | |
|---|---|---|
| 856,271 | Germany | Nov. 20, 1952 |